United States Patent
Bellino et al.

(10) Patent No.: US 9,278,386 B1
(45) Date of Patent: Mar. 8, 2016

(54) HOLE REDUCING TOOL

(71) Applicant: General Electric Company, Schenectady, NY (US)

(72) Inventors: Mark Carmine Bellino, Greenville, SC (US); Daniel James Dorriety, Travelers Rest, SC (US); Heath Michael Ostebee, Piedmont, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/476,776

(22) Filed: Sep. 4, 2014

(51) Int. Cl.
*B21D 35/00* (2006.01)
*B21C 23/00* (2006.01)
*B21D 1/06* (2006.01)
*B60C 25/18* (2006.01)

(52) U.S. Cl.
CPC ............ *B21D 35/001* (2013.01); *B21C 23/001* (2013.01); *B21D 1/06* (2013.01); *B60C 25/18* (2013.01)

(58) Field of Classification Search
CPC ......... B60C 25/18; B21C 23/001; B21D 1/06
USPC ............................................. 72/334, 457, 460
See application file for complete search history.

(56) References Cited

U.S. PATENT DOCUMENTS

| | | | | |
|---|---|---|---|---|
| 2,860,421 A | | 7/1955 | Smith | |
| 3,744,291 A | * | 7/1973 | Hagerty | B21D 1/06 72/325 |
| 3,765,220 A | * | 10/1973 | Kirspel | B21D 1/06 72/460 |
| 4,376,385 A | * | 3/1983 | Davis | B21D 1/06 7/100 |
| 4,429,562 A | * | 2/1984 | Hultquist | B21D 1/06 227/147 |
| 4,545,440 A | | 10/1985 | Treadway | |
| 5,329,802 A | * | 7/1994 | Nunez | B21D 1/06 72/457 |
| 5,934,139 A | * | 8/1999 | Tucker | B21D 1/06 173/90 |
| 6,474,198 B2 | * | 11/2002 | Lowther | B21D 1/06 173/90 |
| 6,615,636 B2 | * | 9/2003 | Easterbrook | B21C 23/001 72/334 |
| 6,742,376 B2 | * | 6/2004 | Easterbrook | B21C 23/001 72/334 |
| 8,327,516 B2 | * | 12/2012 | Kliskey | B60C 25/18 29/253 |
| 2012/0255989 A1 | | 10/2012 | Cui et al. | |
| 2012/0328902 A1 | | 12/2012 | Cui et al. | |
| 2013/0174923 A1 | | 7/2013 | Bellino et al. | |
| 2013/0283798 A1 | | 10/2013 | Bellino et al. | |
| 2013/0283806 A1 | | 10/2013 | Monaghan et al. | |
| 2013/0298369 A1 | | 11/2013 | Reyes et al. | |
| 2014/0000111 A1 | | 1/2014 | Bellino et al. | |
| 2014/0017021 A1 | | 1/2014 | Bellino et al. | |

* cited by examiner

*Primary Examiner* — David B Jones

(74) *Attorney, Agent, or Firm* — Sutherland Asbill & Brennan LLP

(57) ABSTRACT

The present application provides a hole reducing tool. The hole reducing tool includes a punch with a conical tip and a pilot and a slide hammer assembly attached to the punch.

18 Claims, 2 Drawing Sheets

HOLE REDUCING TOOL

TECHNICAL FIELD

The present application and the resultant patent relate generally to repair tools and more particularly relate to a hole reducing tool to reduce the size of a hole in a metal component such as a fuel nozzle for a turbine engine and other types of industrial equipment.

BACKGROUND OF THE INVENTION

When a passageway or a hole in a metal component of industrial equipment is found to be oversized for a given operational parameter or other reason, it may be difficult and/or uneconomical to reduce the hole size. For example, a fuel nozzle flange hole and the like may be found to be oversized for a given airflow specification. Known methods of reducing hole size include the use of a flat faced punch to ovalize iteratively the holes in an effort to restrict the flow therethrough. After a number of adjustment cycles, however, the component may be scrapped due to overworking of the metal. Welding the hole and then reopening may be a further option. This technique, however, may be expensive and time consuming and also may have an impact on the integrity of the component.

There is thus a desire for improved hole reducing tools and techniques that may provide hole size adjustment with reduced scrapping due to overworking of the metal component. Moreover, such improved hole reducing tools and techniques may provide faster and more accurate adjustments for improved overall efficiency and extended performance.

SUMMARY OF THE INVENTION

The present application and the resultant patent thus provide a hole reducing tool. The hole reducing tool includes a punch with a conical tip and a pilot and a slide hammer assembly attached to the punch.

The present application and the resultant patent further provide a method of reducing a size of a hole in a wall with a hole reducing tool. The method may include the steps of inserting a pilot of the hole reducing tool into the hole, positioning a blunt end of a conical tip of the hole reducing tool against a wall portion of the wall surrounding the hole, striking a slide hammer assembly of the hole reducing tool, and collapsing the wall portion about the pilot.

The present application and the resultant patent further provide a hole reducing tool. The hole reducing tool may include an elongated shaft, a conical tip connected to the elongated shaft and having a blunt end, a concentric pilot connected to the conical tip, and a slide hammer assembly attached to the elongated shaft. A number of conical tips and concentric pilots may be provided.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
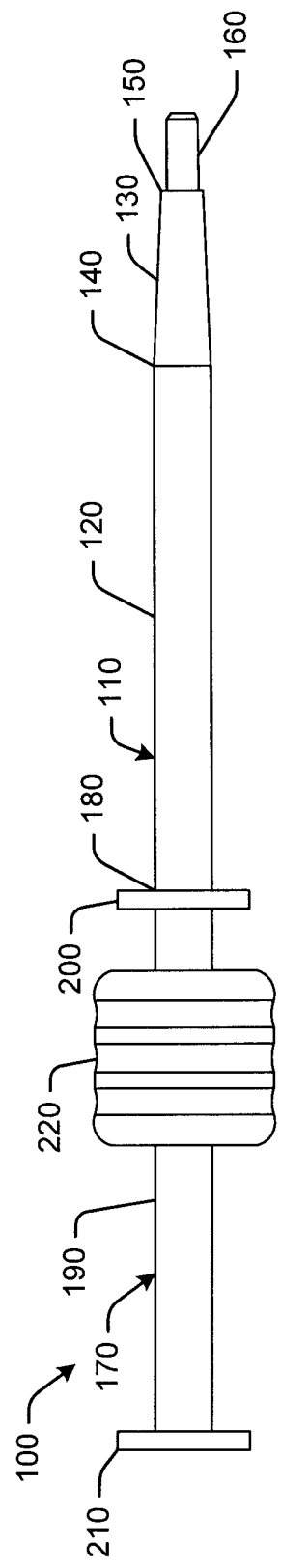
FIG. 1 is a side plan view of a hole reducing tool as may be described herein.

Referring now to the drawings, in which like numerals refer to like elements throughout the several views, FIG. 1 shows a hole reducing tool 100 as may be described herein. The hole reducing tool 100 may include a punch 110. The punch 110 may include an elongated shaft 120. The elongated shaft 120 may have any suitable length and/or diameter. The punch 110 may include a conical tip 130. The conical tip 130 may be positioned at a downstream end 140 of the elongated shaft 120. The conical tip 130 may reduce in diameter from the elongated shaft 120 to a blunt end 150 thereof. The conical tip 130 may have any suitable length and/or diameter and may have any suitable angle. The blunt end 150 may be substantially flat.

The punch 110 also includes a concentric pilot 160. The concentric pilot 160 may extend downstream from the blunt end 150 of the conical tip 130. The concentric pilot 160 may have a reduced diameter with respect to the blunt end 150 of the conical tip 130. The concentric pilot 160 may have any suitable length and/or diameter. Other components and other configurations may be used herein.

The punch 110 and the components thereof may be made from any suitable hardened metal material such as tool steel, carbide, and the like. In this example, the elongated shaft 120, the conical tip 130, and the concentric pilot 160 may be separate, replaceable parts of elements. The conical tip 130 may be attached to the elongated shaft 120 via threaded fasteners, slip/press fits, and the like. The concentric pilot 160 may be attached to the conical tip 130 via mechanical threaded fastening, slip/press fits, and the like. Other types of connection means and/or devices may be used herein. As will be described in more detail below, integrated parts or elements also may be used herein in whole or in part.

The hole reducing tool 100 also may include a slide hammer assembly 170. The slide hammer assembly 170 may be positioned about an upstream end 180 of the elongated shaft 120 of the punch 110. The punch 110 and the slide hammer 170 may be attached via mechanical threaded fastening, slip/press fits, fusion welding, billet machining, and the like. Other types of connection means and/or devices may be used herein. The slide hammer assembly 170 may include a hammer shaft 190. The hammer shaft 190 may have any suitable length and/or diameter. The hammer shaft 190 may have an upstream stop 200 and a downstream stop 210 positioned thereon. The stops 200, 210 may be fixedly attached to the hammer shaft 190 and/or the stops 200, 210 may be integrally formed therewith. The stops 200, 210 may have any suitable size or shape. The slide hammer assembly 170 also may have a hammer 220 positioned on the hammer shaft 190. The hammer 220 may be substantially tubular in shape and may slide up and down along the hammer shaft 190 between the stops 200, 210. The hammer 220 may be weighted. The hammer 220 may have any suitable size, shape, or configuration. The hammer shaft 190, the stops 200, 210, and the hammer 220 may be made out of any suitable hardened metal material such as tools steels, carbide, and the like. Other components and other configurations may be used herein.

Figure 2:
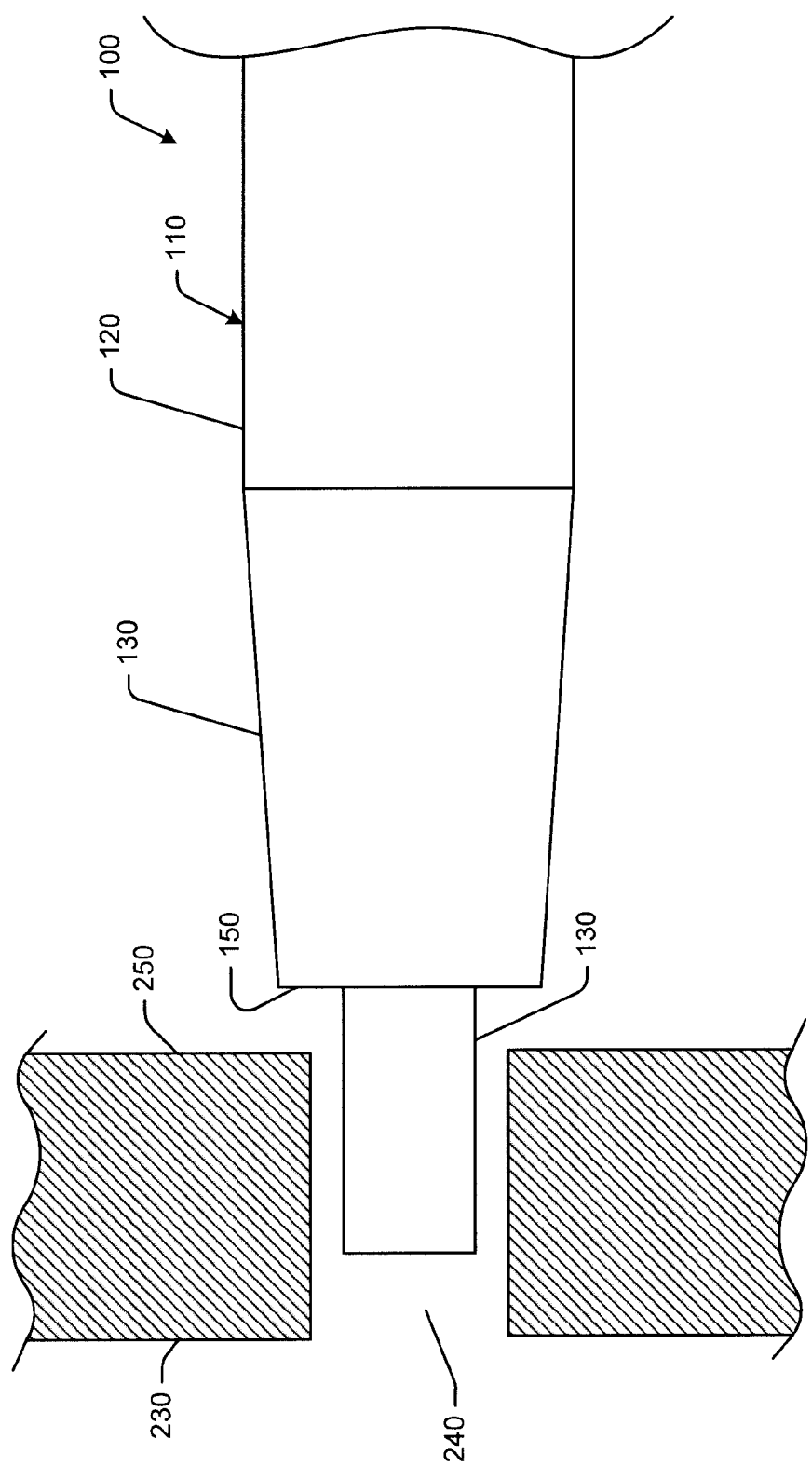
FIG. 2 is a side view of the hole reducing tool of FIG. 1 positioned adjacent to a hole.

FIG. 2 shows an example of the hole reducing tool 100 in operation. In this example, a wall 230 with a hole 240 is shown. As described above, the wall 230 may be a fuel nozzle flange and the like with the hole 240 being an oversized air passageway therein. The wall 230, however, may be any type of surface with any dimension. The concentric pilot 160 may be positioned within the hole 240 and concentrically located therein. The blunt end 150 of the conical tip 130 of the punch 110 thus may be in contact with a wall portion 250 of the wall 230 surrounding the hole 240. Force may be applied to the conical tip 130 of the punch 110 by striking repeatedly the hammer 220 of the slide hammer assembly 170 against the downstream stop 210. This striking motion transfers force to the conical tip 130 so as to collapse the wall portion 250 surrounding the hole 240 onto the concentric pilot 160 so as to reduce the size of the hole 240. Any number of strikes may be required.

The conical tip 130 and the concentric pilot 160 may be replaceable. Specifically, the concentric pilot 160 may be changed out so as to match the desired internal hole diameter. Any number of concentric pilots 160 thus may be provided with varying diameters and/or lengths. Likewise, the concentric tip 130 also may be replaced if damaged.

Figure 3:
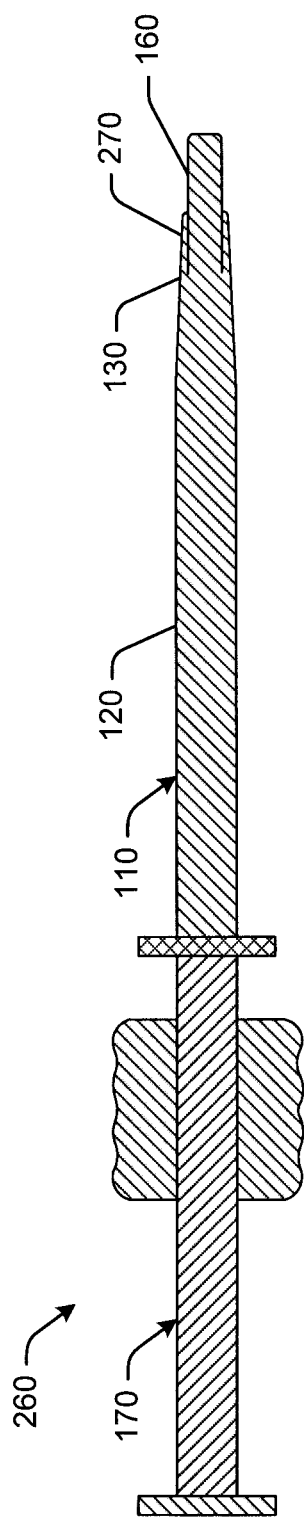
FIG. 3 is a cross-sectional view of an alternative embodiment of a hole reducing tool as may be described herein.

FIG. 3 shows an alternative embodiment of a hole reducing tool 260 as may be described herein. In this example, the punch 110 may be an integrated element. Specifically, the concentric pilot 160 may be integrated with the conical tip 130 and the elongated shaft 120. The concentric pilot 160 and the conical tip 130 may be joined as compressible leaf spring 270. Other types of connection means may be used herein. Any combination of the components of the punch 110 may be separate and replaceable or integrated in any fashion. Other components and other configurations may be used herein.

The hole reducing tool 100 described herein thus provides faster and more accurate hole adjustments as compared to known devices. Moreover, the hole reducing tool 100 reduces the iterative deformation of holes that may lead to scrapping the entire component. Moreover, no additional tools are needed given the integrated slide hammer assembly 170.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A hole reducing tool, comprising:
a punch;
the punch comprising an elongated shaft, a conical tip, and a pilot;
wherein the conical tip and the pilot are connected by a compression leaf spring; and
a slide hammer assembly attached to the punch.

2. The hole reducing tool of claim 1, wherein the elongated shaft, the conical tip, and the pilot comprise replaceable parts.

3. The hole reducing tool of claim 2, further comprising a plurality of pilots with differing diameters.

4. The hole reducing tool of claim 2, further comprising a plurality of replaceable conical tips.

5. The hole reducing tool of claim 1, wherein the elongated shaft, the conical tip, and the pilot comprise an integrated part.

6. The hole reducing tool of claim 1, wherein the conical tip comprises a blunt end.

7. The hole reducing tool of claim 1, wherein the pilot comprises a concentric pilot.

8. The hole reducing tool of claim 1, wherein the slide hammer assembly comprises a hammer shaft with a pair of stops thereon.

9. The hole reducing tool of claim 8, wherein the slide hammer assembly comprises a hammer on the hammer shaft.

10. A method of reducing a size of a hole in a wall with a hole reducing tool, comprising:
inserting a pilot of the hole reducing tool into the hole;
positioning a blunt end of a conical tip of the hole reducing tool against a wall portion of the wall surrounding the hole;
striking a slide hammer assembly of the hole reducing tool; and
collapsing the wall portion about the pilot.

11. The method of claim 10, further comprising the step of selecting the pilot based upon a desired hole size.

12. The method of claim 10, further comprising the step of replacing the pilot.

13. The method of claim 10, further comprising the step of replacing the conical tip.

14. A hole reducing tool, comprising:
an elongated shaft;
a conical tip connected to the elongated shaft;
the conical tip comprising a blunt end;
a concentric pilot connected to the conical tip by a compression leaf spring; and
a slide hammer assembly attached to the elongated shaft.

15. The hole reducing tool of claim 14, wherein the elongated shaft, the conical tip, and the concentric pilot comprise replaceable parts.

16. The hole reducing tool of claim 15, further comprising a plurality of concentric pilots with differing diameters.

17. The hole reducing tool of claim 14, wherein the elongated shaft, the conical tip, and the pilot comprise an integrated part.

18. The hole reducing tool of claim 14, wherein the slide hammer assembly comprises a hammer and a hammer shaft with a pair of stops thereon.

* * * * *